(12) United States Patent
Aiga et al.

(10) Patent No.: US 11,226,421 B2
(45) Date of Patent: Jan. 18, 2022

(54) RADIATION DETECTOR

(71) Applicant: KABUSHIKI KAISHA TOSHIBA, Minato-ku (JP)

(72) Inventors: Fumihiko Aiga, Kawasaki (JP); Atsushi Wada, Kawasaki (JP); Kohei Nakayama, Kawasaki (JP); Yuko Nomura, Kawasaki (JP); Sara Yoshio, Yokohama (JP); Rei Hasegawa, Yokohama (JP); Isao Takasu, Setagaya (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/816,005

(22) Filed: Mar. 11, 2020

(65) Prior Publication Data
US 2021/0055435 A1     Feb. 25, 2021

(30) Foreign Application Priority Data

Aug. 20, 2019   (JP) .............................. JP2019-150488

(51) Int. Cl.
*G01T 1/24*   (2006.01)

(52) U.S. Cl.
CPC .............. *G01T 1/242* (2013.01); *G01T 1/247* (2013.01)

(58) Field of Classification Search
CPC ................................. G01T 1/242; G01T 1/247
See application file for complete search history.

(56) References Cited

U.S. PATENT DOCUMENTS

| 2005/0110007 A1* | 5/2005 | Forrest | ................ H01L 51/4246 257/40 |
| 2006/0040139 A1* | 2/2006 | Herron | ................ H01L 51/0081 428/690 |
| 2018/0143329 A1 | 5/2018 | Takasu et al. | |
| 2019/0056515 A1 | 2/2019 | Kobayashi et al. | |
| 2020/0264320 A1 | 8/2020 | Aiga et al. | |
| 2020/0313094 A1 | 10/2020 | Wada et al. | |

FOREIGN PATENT DOCUMENTS

| JP | 2018-85387 A | 5/2018 |
| JP | 2019-35703 A | 3/2019 |
| JP | 2020-134302 A | 8/2020 |
| JP | 2020-136561 A | 8/2020 |

OTHER PUBLICATIONS

I.H. Campbell, et al., "Efficient plastic scintillators utilizing phosphorescent dopants", Applied Physics Letters, 90, 012117, 2007, 4 pages.
Patrick L. Feng, et al., "Spectral- and Pulse-Shape Discrimination in Triplet-Harvesting Plastic Scintillators", IEEE Transactions on Nuclear Science, vol. 59, No. 6, Dec. 2012, 8 pages.
Edgar V. Van Loef, et al., "Triplet Harvesting Plastic Scintillators with Neutron-Gamma Pulse Shape Discrimination", Proc. of SPIE, vol. 9213, 9 pages.

* cited by examiner

*Primary Examiner* — Hugh Maupin
(74) *Attorney, Agent, or Firm* — Oblon, McClelland, Maier & Neustadt, L.L.P.

(57) ABSTRACT

According to one embodiment, a radiation detector includes a first layer including a metal complex, a first conductive layer, a second conductive layer provided between the first layer and the first conductive layer, and an organic semiconductor layer provided between the first conductive layer and the second conductive layer.

18 Claims, 7 Drawing Sheets

RADIATION DETECTOR

CROSS-REFERENCE TO RELATED APPLICATIONS

This application is based upon and claims the benefit of priority from Japanese Patent Application No. 2019-150488, filed on Aug. 20, 2019; the entire contents of which are incorporated herein by reference.

FIELD

Embodiments described herein relate generally to a radiation detector.

BACKGROUND

For example, there is a radiation detector that uses an organic semiconductor material. It is desirable to increase the detection accuracy of the radiation detector.

DETAILED DESCRIPTION

Figure 1:
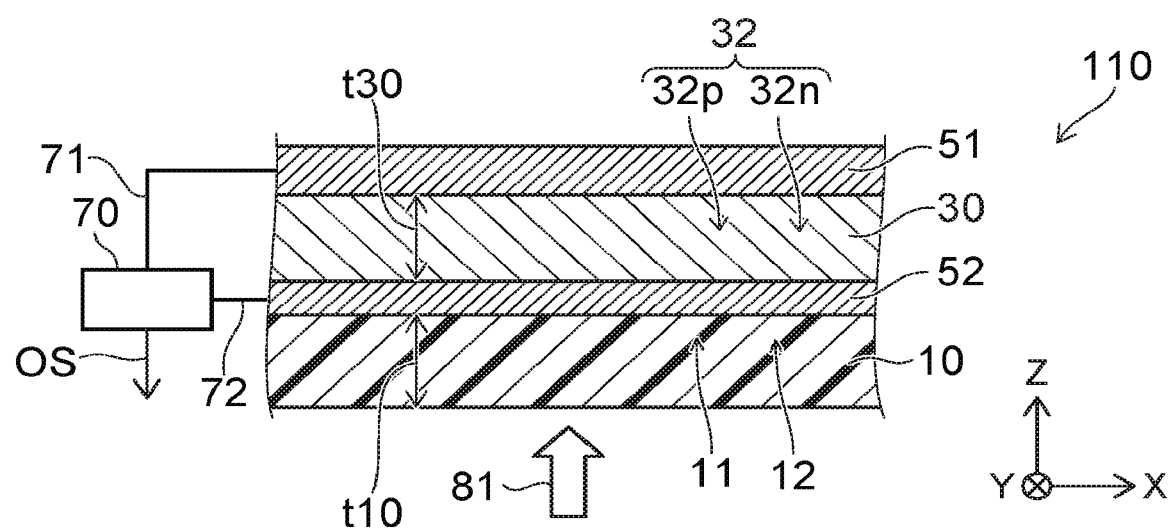
FIG. 1 is a schematic cross-sectional view illustrating a radiation detector according to a first embodiment.

According to one embodiment, a radiation detector includes a first layer including a metal complex, a first conductive layer, a second conductive layer provided between the first layer and the first conductive layer, and an organic semiconductor layer provided between the first conductive layer and the second conductive layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a radiation detector according to a first embodiment.

Figure 2:
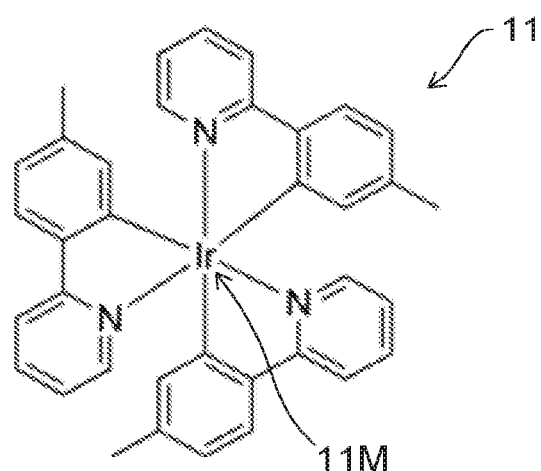
FIG. 2 is a schematic view illustrating a portion of the radiation detector according to the first embodiment.
Figure 3:
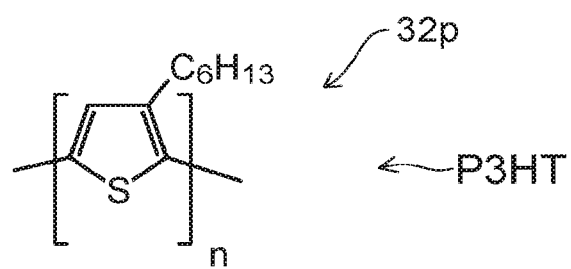
FIG. 3 is a schematic view illustrating a portion of the radiation detector according to the first embodiment.
Figure 4:
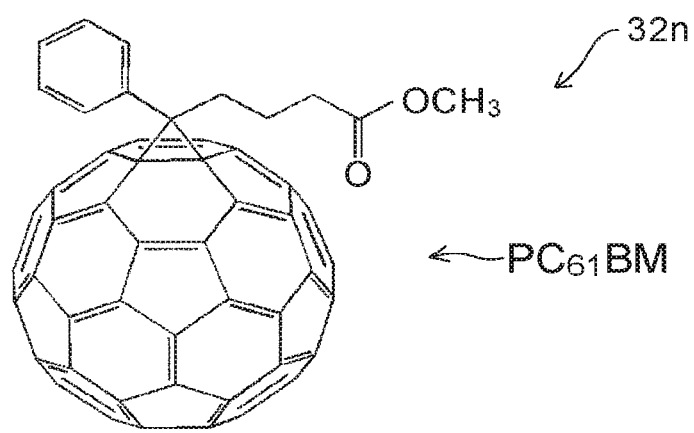
FIG. 4 is a schematic view illustrating a portion of the radiation detector according to the first embodiment.

FIGS. 2 to 4 are schematic views illustrating portions of the radiation detector according to the first embodiment.

As shown in FIG. 1, the radiation detector 110 according to the embodiment includes a first layer 10, a first conductive layer 51, a second conductive layer 52, and an organic semiconductor layer 30.

The second conductive layer 52 is provided between the first layer 10 and the first conductive layer 51. The organic semiconductor layer 30 is provided between the first conductive layer 51 and the second conductive layer 52.

The first layer 10 includes a metal complex 11. The first layer 10 may further include an organic portion 12. The organic portion 12 includes, for example, at least one selected from the group consisting of polyvinyl carbazole, polyvinyl toluene, polystyrene, and polymethyl methacrylate.

FIG. 2 shows an example of the metal complex 11. In the example, the metal complex 11 includes Ir(mppy)3 (Tris[2-(p-tolyl)pyridine]iridium(III)). The metal complex 11 includes a first metallic element 11M. The first metallic element 11M includes, for example, at least one selected from the group consisting of Ir, Pt, and Cu. In the example, the first metallic element 11M includes Ir. For example, the atomic number of the first metallic element 11M may be 29 or more. The first metallic element 11M is, for example, a heavy element.

As shown in FIG. 1, the organic semiconductor layer 30 includes a p-type region $32p$ and an n-type region $32n$. The p-type region $32p$ and the n-type region $32n$ are included in an organic semiconductor 32.

FIG. 3 illustrates the p-type region $32p$. In the example, the p-type region $32p$ includes P3HT (Poly(3-hexylthiophene)).

FIG. 4 includes the n-type region $32n$. For example, the n-type region $32n$ includes fullerene. In the example, the n-type region $32n$ includes $PC_{61}BM$ ([6,6]-phenyl-C61-butyric acid methyl ester).

As shown in FIG. 1, a first direction from the second conductive layer 52 toward the first conductive layer 51 is taken as a Z-axis direction. One direction perpendicular to the Z-axis direction is taken as an X-axis direction. A direction perpendicular to the Z-axis direction and the X-axis direction is taken as a Y-axis direction. The first direction is the stacking direction.

For example, the first conductive layer 51, the second conductive layer 52, and the organic semiconductor layer 30 spread along the X-Y plane. The first layer 10 spreads along the X-Y plane.

A detection circuit 70 is provided in the example. The detection circuit 70 is electrically connected to the first conductive layer 51 and the second conductive layer 52. For example, the detection circuit 70 is electrically connected to the first conductive layer 51 by a first wiring 71. For example, the detection circuit 70 is electrically connected to the second conductive layer 52 by a second wiring 72. The detection circuit 70 outputs a signal OS corresponding to the intensity of radiation 81 incident on the first layer 10.

The radiation 81 includes, for example, β-rays. The radiation 81 may include, for example, γ-rays. For example, the radiation 81 enters from the first layer 10 side.

Light is produced in the first layer 10 when the radiation 81 enters the first layer 10. The produced light passes through the second conductive layer 52 and enters the organic semiconductor layer 30. A movable charge is generated in the organic semiconductor layer 30 based on the light entering the organic semiconductor layer 30. The detection circuit 70 applies a voltage between the first conductive layer 51 and the second conductive layer 52. Thereby, the generated charge moves toward the first conductive layer 51 or the second conductive layer 52. The charge that moves is detected by the detection circuit 70. The radiation 81 which is the detection object can be detected thereby.

For example, the first layer 10 functions as a scintillator. The first layer 10 is not an inorganic scintillator.

In the case of a first reference example using an inorganic scintillator, light is produced not only by β-rays but also when γ-rays are incident. Therefore, in the first reference example, for applications in which β-rays are to be detected separately from γ-rays, it is difficult to detect β-rays with high accuracy due to the effects of γ-rays.

In the embodiment, the first layer 10 is a layer of an organic material. If the first layer 10 is not excessively thick, the γ-rays that enter the first layer 10 substantially pass through the first layer 10. The amount of light caused by γ-rays in the first layer 10 is slight. Therefore, the first layer 10 is substantially not sensitive to γ-rays. The effects of γ-rays can be suppressed when detecting β-rays.

In a second reference example, an organic scintillator which does not include a metal complex is used. In the second reference example as well, the γ-rays pass through the first layer 10 if the organic scintillator is not excessively thick. Therefore, in the second reference example as well, the effects of γ-rays can be suppressed when detecting β-rays. However, the sensitivity to β-rays is low in the second reference example not using a metal complex. In other words, in the second reference example, the sensitivity to both γ-rays and β-rays is low when the organic scintillator is not excessively thick. By setting the organic scintillator to be thick, not only the sensitivity to β-rays but also the sensitivity to γ-rays undesirably increases. Therefore, in the second reference example, it is difficult to detect β-rays with high accuracy while suppressing the effects of γ-rays.

Conversely, in the embodiment, the first layer 10 which functions as the scintillator includes the metal complex 11. The γ-rays that enter the first layer 10 substantially pass through the first layer 10. Light is produced efficiently from the metal complex 11 based on the β-rays entering the first layer 10. The light is, for example, phosphorescence. The intensity of the light is high. The highly-intense light passes through the second conductive layer 52 and enters the organic semiconductor layer 30. In the organic semiconductor layer 30, the highly intense light is converted into a charge; and a very strong signal OS is obtained.

According to the embodiment, for example, the effects of γ-rays can be suppressed; and β-rays can be detected with high sensitivity. According to the embodiment, a radiation detector can be provided in which the detection accuracy can be increased.

If the first layer 10 is excessively thick, there is a possibility that γ-rays may be converted into light in the first layer 10. It is favorable for a thickness t10 of the first layer 10 (referring to FIG. 1) to be, for example, 1500 μm or less. By setting the thickness t10 to be 1500 μm or less, the effects of γ-rays can be suppressed effectively. If the thickness t10 of the first layer 10 is excessively thin, the sensitivity to β-rays decreases. It is favorable for the thickness t10 of the first layer 10 to be, for example, 200 μm or more. By setting the thickness t10 to be 200 μm or more, the β-rays can be changed into light with high sensitivity; and high sensitivity is obtained. The thickness t10 is a length along the Z-axis direction.

In the embodiment as recited above, the radiation 81 is converted into light in the first layer 10; and the light is converted into an electrical signal in the organic semiconductor layer 30. The radiation detector 110 uses indirect conversion. Direct conversion may occur in the radiation detector 110. For example, a portion of the incident β-rays is converted into light in the first layer 10. Another portion of the incident β-rays may pass through the first layer 10 and the second conductive layer 52 and enter the organic semiconductor layer 30; and charges based on the β-rays may be generated in the organic semiconductor layer 30.

Figure 5A:
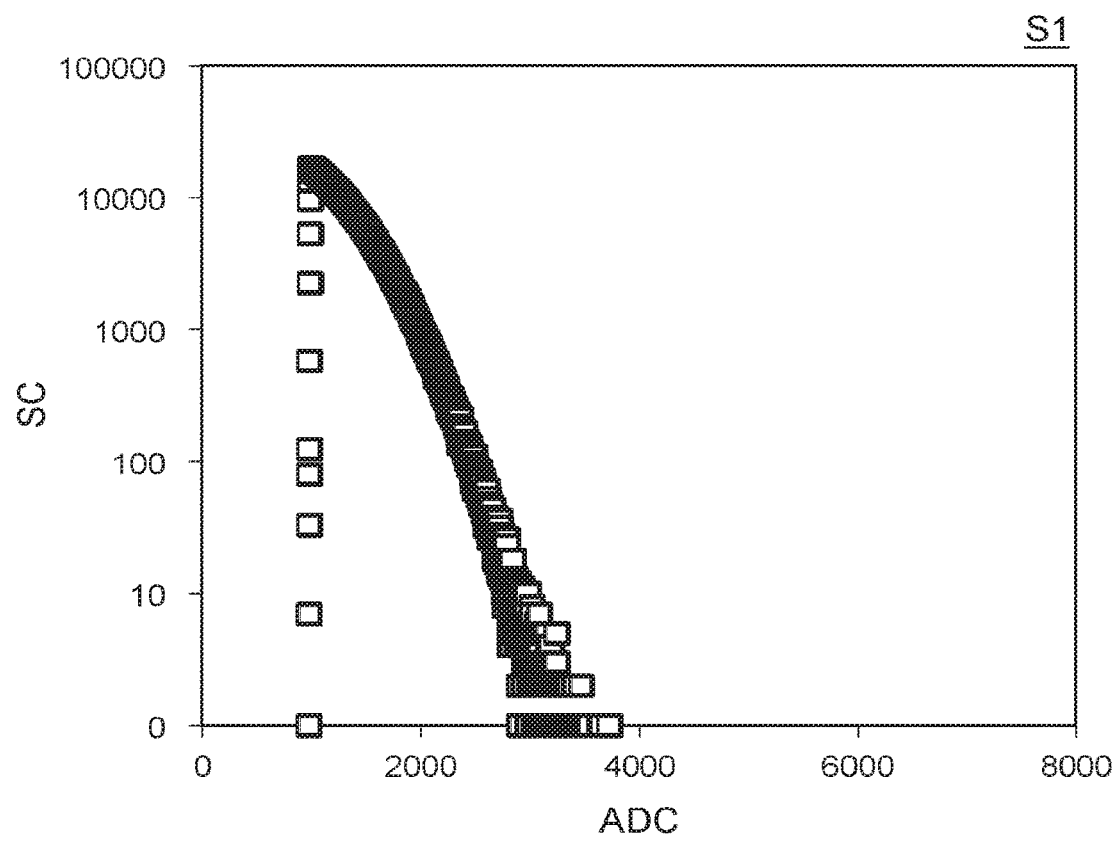
FIG. 5A and FIG. 5B are graphs illustrating characteristics of the radiation detector according to the first embodiment.
Figure 5B:
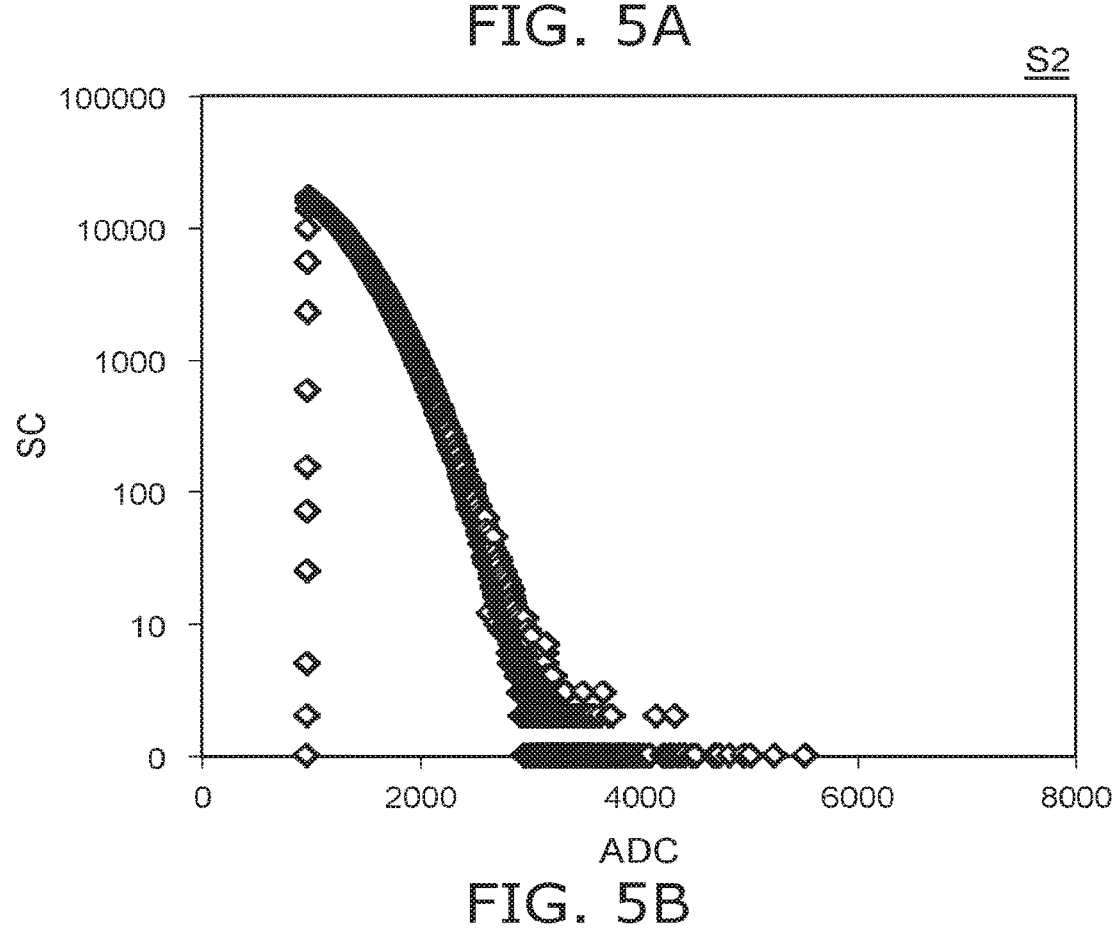

FIG. 5A and FIG. 5B are graphs illustrating characteristics of the radiation detector according to the first embodiment.

FIG. 5A and FIG. 5B show an example of measurement results of characteristics of the radiation detector 110. In the example, the first layer 10 includes the metal complex 11 and the organic portion 12. The metal complex 11 is Ir(mppy)3. The organic portion 12 is polyvinyl carbazole. The concentration of the metal complex 11 in the first layer 10 is 4 wt %. The thickness t10 of the first layer 10 is 1.3 mm. The organic semiconductor layer 30 includes P3HT and $PC_{61}BM$. A thickness t30 of the organic semiconductor layer 30 (referring to FIG. 1) is 1.3 μm. The thickness t30 is a length along the Z-axis direction. The first conductive layer 51 is aluminum. The second conductive layer 52 is ITO (Indium Tin Oxide).

In FIG. 5A and FIG. 5B, the horizontal axis is a peak value ADC of a multichannel analyzer for the detection circuit 70. In FIG. 5A and FIG. 5B, the vertical axis is the detected count SC. FIG. 5A shows a background signal S1 when β-rays are not incident. FIG. 5B shows a signal S2 when β-rays due to Sr90 are incident. It can be seen from FIG. 5A and FIG. 5B that β-rays are detected.

An example of simulation results of characteristics of the radiation detector will now be described.

In a first simulation, the detection of β-rays of Co-60 is assumed. In the model of the first simulation, the thickness t10 of the first layer 10 is 0.3 mm. The first layer 10 includes Ir(mppy)3 and polyvinyl carbazole. The threshold of the detection energy is 115 keV.

In the first simulation, the detection efficiency of β-rays of Co-60 is 30% when the concentration of the metal complex 11 in the first layer 10 is 4 wt %. In such a case, the ratio of the intensity of β-rays of Co-60 to the intensity of γ-rays of Co-60 is 1170. The ratio of the intensity of β-rays of Co-60 to the intensity of the γ-rays of the $^{137}Ba$ isotope is 455.

In the first simulation, the detection efficiency of β-rays of Co-60 is 32% when the concentration of the metal complex 11 in the first layer 10 is 40 wt %. In such a case, the ratio of the intensity of β-rays of Co-60 to the intensity of γ-rays of Co-60 is 1077. The ratio of the intensity of β-rays of Co-60 to the intensity of the γ-rays of the $^{137}Ba$ isotope is 344.

In a second simulation, the detection of β-rays of Sr-90 (or Y-90) is assumed. In the model of the second simulation, the thickness t10 of the first layer 10 is 0.9 mm. In such a case as well, the first layer 10 includes Ir(mppy)3 and polyvinyl carbazole. The threshold of the detection energy is 115 keV.

In the second simulation, the detection efficiency of β-rays of Y-90 is 95% when the concentration of the metal complex 11 in the first layer 10 is 4 wt %. In such a case, the ratio of the intensity of β-rays of Y-90 to the intensity of the γ-rays of the $^{137}$Ba isotope is 164. The ratio of the intensity of β-rays of Y-90 to the intensity of γ-rays of Co-60 is 240.

In the second simulation, the detection efficiency of β-rays of Y-90 is 95% when the concentration of the metal complex 11 in the first layer 10 is 40 wt %. In such a case, the ratio of the intensity of β-rays of Y-90 to the intensity of the γ-rays of the $^{137}$Ba isotope is 147. The ratio of the intensity of β-rays of Y-90 to the intensity of γ-rays of Co-60 is 209.

Thus, in the embodiment β-rays can be detected with high sensitivity. β-rays can be detected separately from γ-rays; and a radiation detector can be provided in which the detection accuracy can be increased.

In the embodiment, it is favorable for the concentration of the metal complex 11 in the first layer 10 to be not less than 0.05 wt % and not more than 40 wt %. By setting the concentration to be 0.05 wt % or more, for example, β-rays are detected easily with high sensitivity. By setting the concentration to be 40 wt % or less, for example, the effects of γ-rays can be suppressed easily. In the embodiment, the concentration may be 0.5 wt % or more. Thereby, for example, β-rays are detected easily, more stably, and with high sensitivity. The concentration may be 10 wt % or less. Thereby, for example, the effects of γ-rays can be suppressed easily and more stably.

In the embodiment, the noise of the obtained signal OS increases when the thickness t30 of the organic semiconductor layer 30 is excessively thin. The strength of the obtained signal OS decreases when the thickness t30 of the organic semiconductor layer 30 is excessively thick. Examples of characteristics when the thickness t30 of the organic semiconductor layer 30 is changed will now be described.

Figure 6:
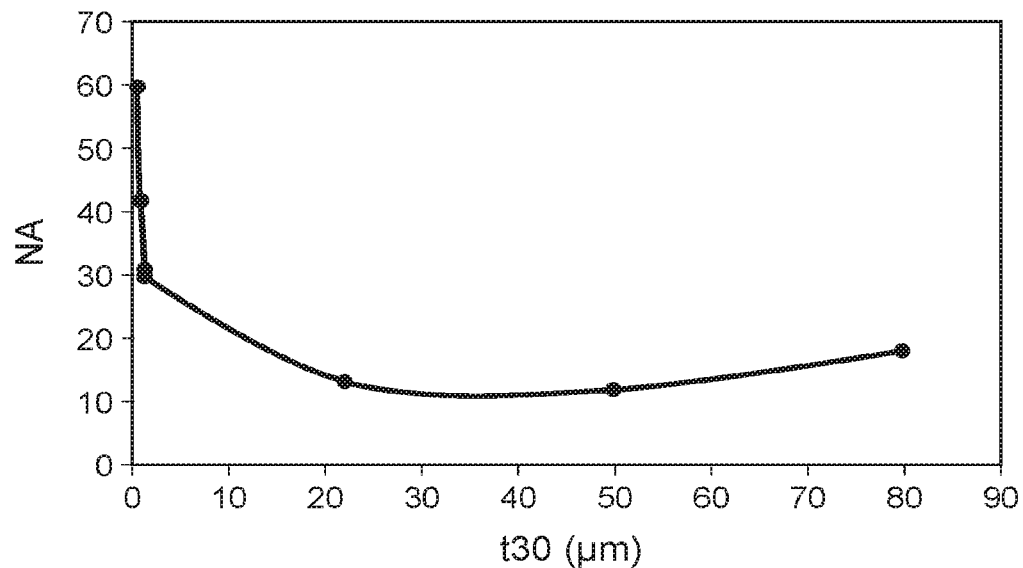
FIG. 6 is a graph illustrating characteristics of the radiation detector.
Figure 7:
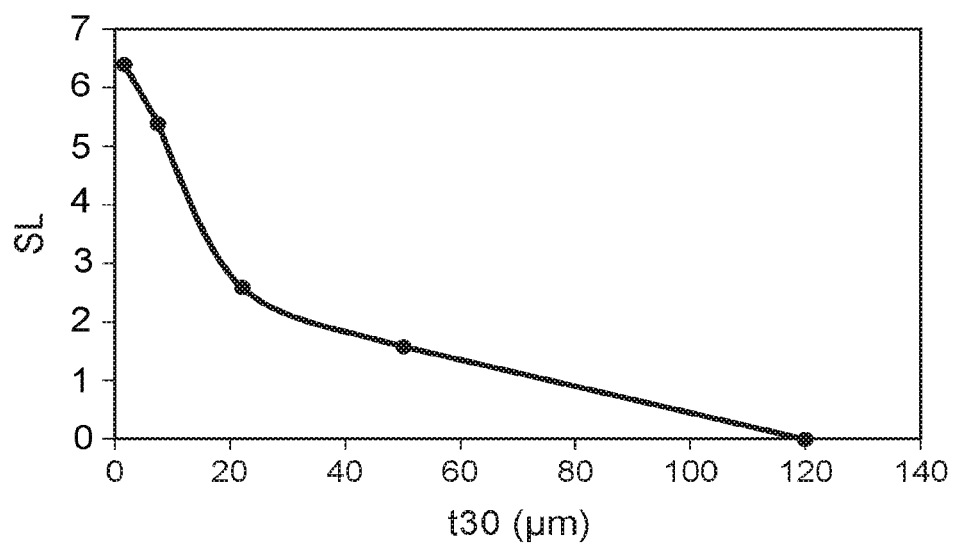
FIG. 7 is a graph illustrating characteristics of the radiation detector.

FIG. 6 and FIG. 7 are graphs illustrating characteristics of the radiation detector.

FIG. 6 and FIG. 7 illustrate measurement results of characteristics when the thickness t30 of the organic semiconductor layer 30 is changed. The concentration of the metal complex 11 in the first layer 10 is 4 wt %. The thickness t10 of the first layer 10 is 1.3 mm.

In FIG. 6 and FIG. 7, the horizontal axis is the thickness t30 of the organic semiconductor layer 30. The vertical axis of FIG. 6 is a noise intensity NA (arbitrary units) of the signal OS. The vertical axis of FIG. 7 is a signal strength SL (arbitrary units) of the signal OS.

As shown in FIG. 6, the noise intensity NA increases as the thickness t30 decreases. The noise intensity NA becomes small when the thickness t30 exceeds 1 μm. It is considered that the noise intensity NA is large when the thickness t30 is thin because a signal corresponding to a large electrostatic capacitance is detected. It is considered that noise intensity NA becomes small when the thickness t30 is thick because the electrostatic capacitance decreases.

It is favorable for the thickness t30 to be greater than 1 μm. For example, the noise intensity NA is reduced thereby. The thickness t30 may be 2 μm or more. For example, the noise intensity NA can be reduced further.

As shown in FIG. 7, the signal strength SL is high when the thickness t30 is thin. The signal strength SL decreases as the thickness t30 increases. For example, it is considered that when the thickness t30 is thick, the charge that is generated in the organic semiconductor layer 30 disappears due to recombination, etc., before reaching the conductive layer. It is considered that the signal strength SL is reduced thereby.

It is favorable for the thickness t30 to be 50 μm or less. For example, a high signal strength SL is obtained thereby. In the embodiment, the thickness t30 of the organic semiconductor layer 30 may be 10 μm or less. A high signal strength SL is obtained more stably thereby.

It is favorable for the sum of the thickness t10 of the first layer 10 and the thickness t30 of the organic semiconductor layer 30 to be, for example, 1.5 mm or less. For example, the effects of γ-rays can be suppressed easily and more stably thereby.

Second Embodiment

Figure 8:
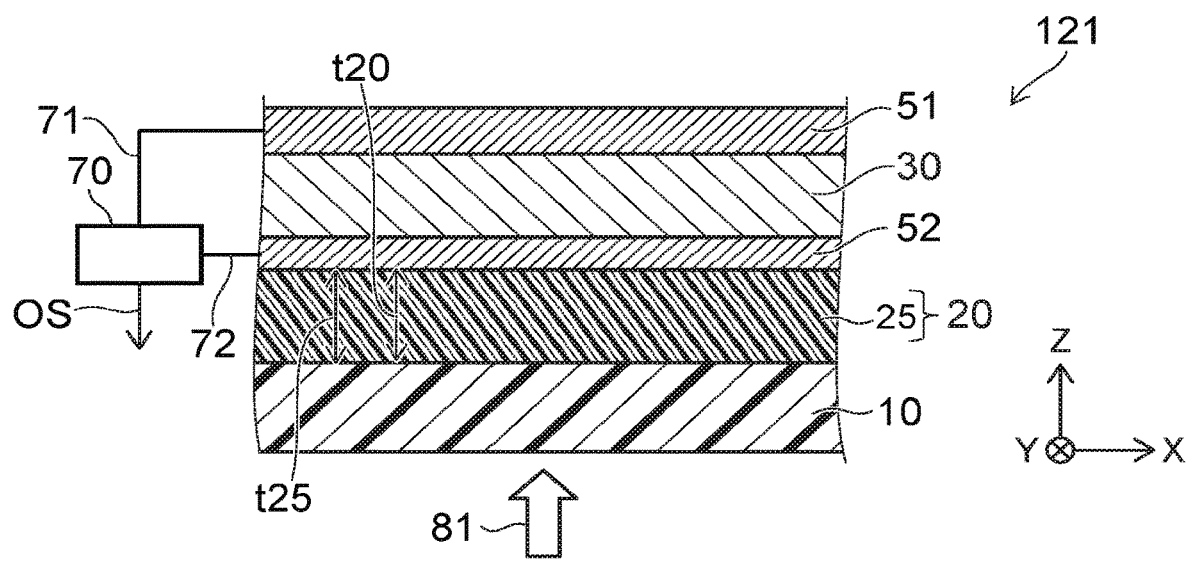
FIG. 8 is a schematic cross-sectional view illustrating a radiation detector according to a second embodiment.

FIG. 8 is a schematic cross-sectional view illustrating a radiation detector according to a second embodiment.

As shown in FIG. 8, the radiation detector 121 according to the second embodiment further includes a second layer 20 in addition to the first layer 10, the first conductive layer 51, the second conductive layer 52, and the organic semiconductor layer 30. The first layer 10, the first conductive layer 51, the second conductive layer 52, and the organic semiconductor layer 30 of the second embodiment may be similar to the first layer 10, the first conductive layer 51, the second conductive layer 52, and the organic semiconductor layer 30 of the first embodiment. An example of the second layer 20 will now be described.

The second layer 20 is provided between the first layer 10 and the second conductive layer 52. The second layer 20 includes an organic layer 25. The organic layer 25 includes, for example, at least one selected from the group consisting of PET, PEN, transparent polyimide, cycloolefin polymer (COP), and polycarbonate. The organic layer 25 is, for example, an organic film.

A thickness t20 of the second layer 20 is, for example, not less than 10 μm and not more than 300 μm. A thickness t25 of the organic layer 25 is, for example, not less than 10 μm and not more than 300 μm. In the example, the thickness t20 corresponds to the thickness t25.

The second layer 20 is light-transmissive. The light that is produced in the first layer 10 passes through the second layer 20 and the second conductive layer 52 and can enter the organic semiconductor layer 30.

By providing the second layer 20, the movement toward the second conductive layer 52 and the organic semiconductor layer 30 of the substances included in the first layer 10 can be suppressed. High reliability is easier to obtain.

Because the second layer 20 includes the organic layer 25, the conversion of γ-rays into light in the second layer 20 can be suppressed even when γ-rays are incident. β-rays can be detected with high accuracy while suppressing the effects of γ-rays. For example, the second layer 20 functions as a base body. The mechanical strength of the radiation detector 121 is increased by the second layer 20.

Figure 9:
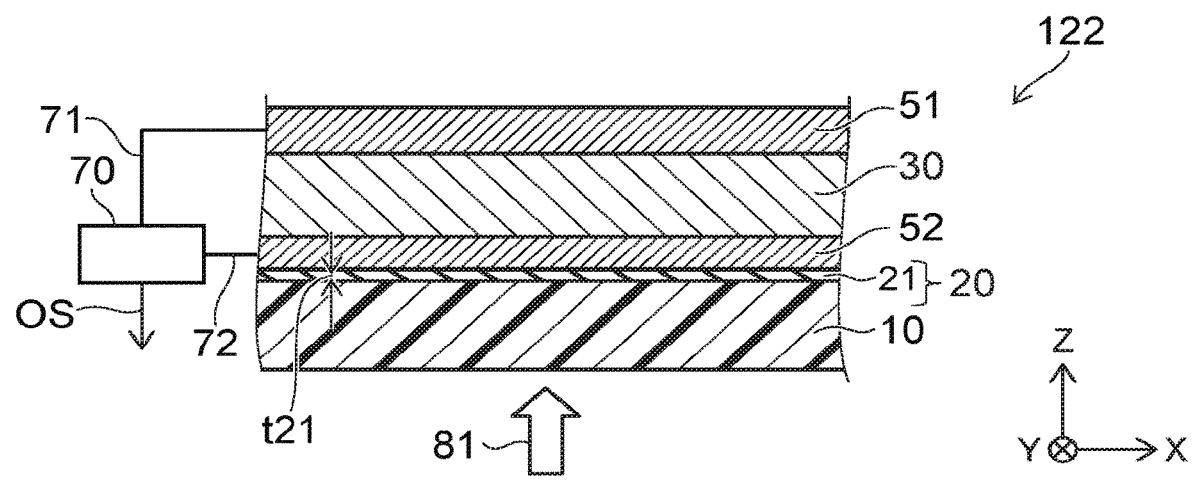
FIG. 9 is a schematic cross-sectional view illustrating a radiation detector according to the second embodiment.

FIG. 9 is a schematic cross-sectional view illustrating a radiation detector according to the second embodiment.

As shown in FIG. 9, the first layer 10, the first conductive layer 51, the second conductive layer 52, the organic semiconductor layer 30, and the second layer 20 are provided in the radiation detector 122 according to the second embodiment as well. In the radiation detector 122, the second layer 20 includes a first intermediate layer 21. The first intermediate layer 21 includes, for example, silicon oxynitride. The first intermediate layer 21 may include silicon oxide, silicon nitride, aluminum oxide, etc. For example, good barrier properties are obtained due to the first intermediate layer 21. For example, the movement toward the second conductive layer 52 and the organic semiconductor layer 30 of the substances included in the first layer 10 can be suppressed. High reliability is easier to obtain.

It is favorable for a thickness t21 of the first intermediate layer 21 to be thin. If the thickness t21 is excessively thick, there are cases where γ-rays are converted into light in the first intermediate layer 21 when incident. By setting the thickness t21 to be thin, the effects of γ-rays can be suppressed. The thickness t21 is, for example, 2 μm or less.

Figure 10:
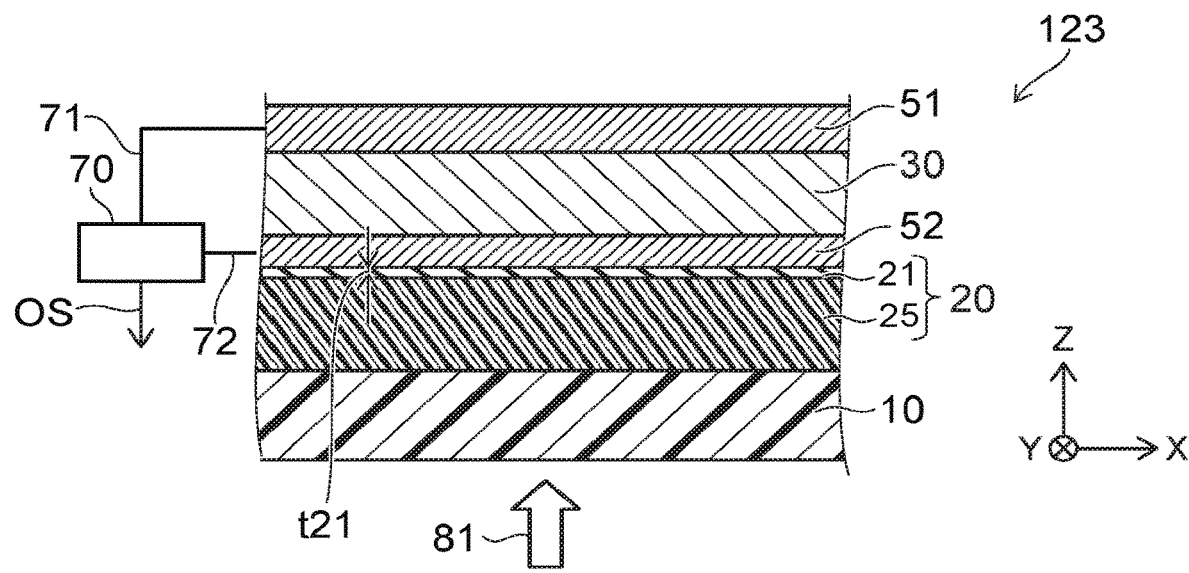
FIG. 10 is a schematic cross-sectional view illustrating a radiation detector according to the second embodiment.
Figure 11:
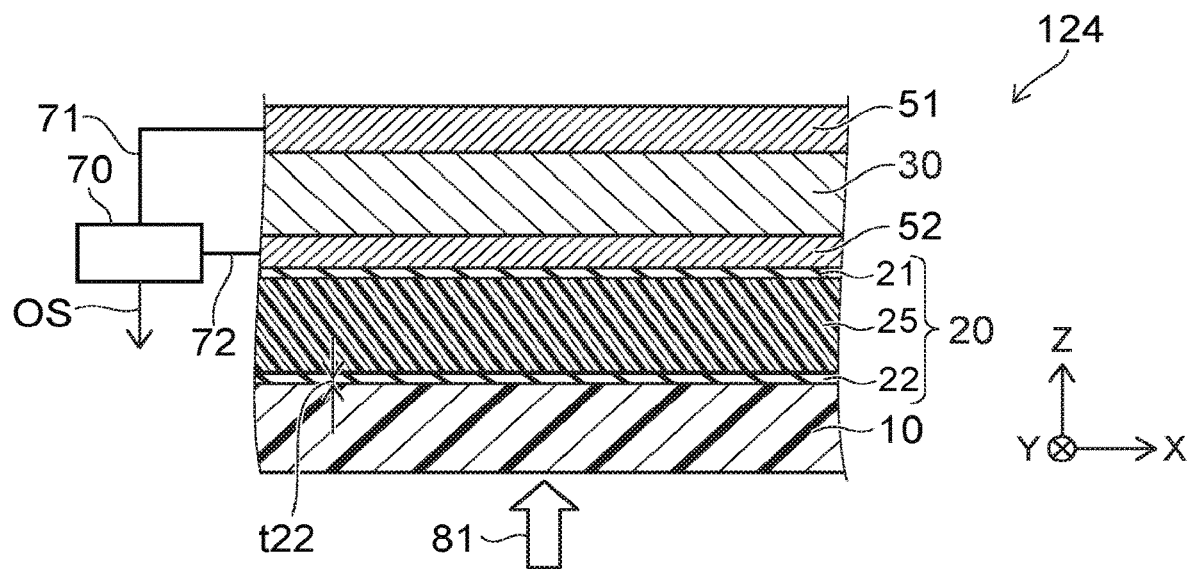
FIG. 11 is a schematic cross-sectional view illustrating a radiation detector according to the second embodiment.

FIG. 10 and FIG. 11 are schematic cross-sectional views illustrating radiation detectors according to the second embodiment.

In a radiation detector 123 according to the second embodiment as shown in FIG. 10, the second layer 20 includes the organic layer 25 and the first intermediate layer 21. In a radiation detector 124 according to the second embodiment as shown in FIG. 11, the second layer 20 includes the organic layer 25, the first intermediate layer 21, and a second intermediate layer 22. The second layer 20 may include at least one of the first intermediate layer 21 or the second intermediate layer 22.

The first intermediate layer 21 is provided between the organic layer 25 and the second conductive layer 52. The first intermediate layer 21 includes a first element including at least one of silicon or aluminum. The second intermediate layer 22 is provided between the first layer 10 and the organic layer 25. The second intermediate layer 22 includes a second element including at least one of silicon or aluminum. The first intermediate layer 21 includes, for example, the first element recited above and at least one of oxygen or nitrogen. The first intermediate layer 21 includes, for example, silicon oxynitride. The second intermediate layer 22 includes the second element recited above and at least one of oxygen or nitrogen. The second intermediate layer 22 includes, for example, silicon oxynitride.

The thickness t21 of the first intermediate layer 21 (referring to FIG. 10) is not less than 1/600 times and not more than 1/5 times the thickness t25 of the organic layer 25 (referring to FIG. 8). A thickness t22 of the second intermediate layer 22 is not less than 1/600 times and not more than 1/5 times the thickness t25 of the organic layer 25. By setting the thicknesses of these intermediate layers to be thin, β-rays can be detected with high precision while suppressing the effects of γ-rays.

For example, good barrier properties are obtained due to at least one of the first intermediate layer 21 or the second intermediate layer 22. For example, the movement toward the second conductive layer 52 and the organic semiconductor layer 30 of the substances included in the first layer 10 can be suppressed. High reliability is easier to obtain.

Third Embodiment

Figure 12:
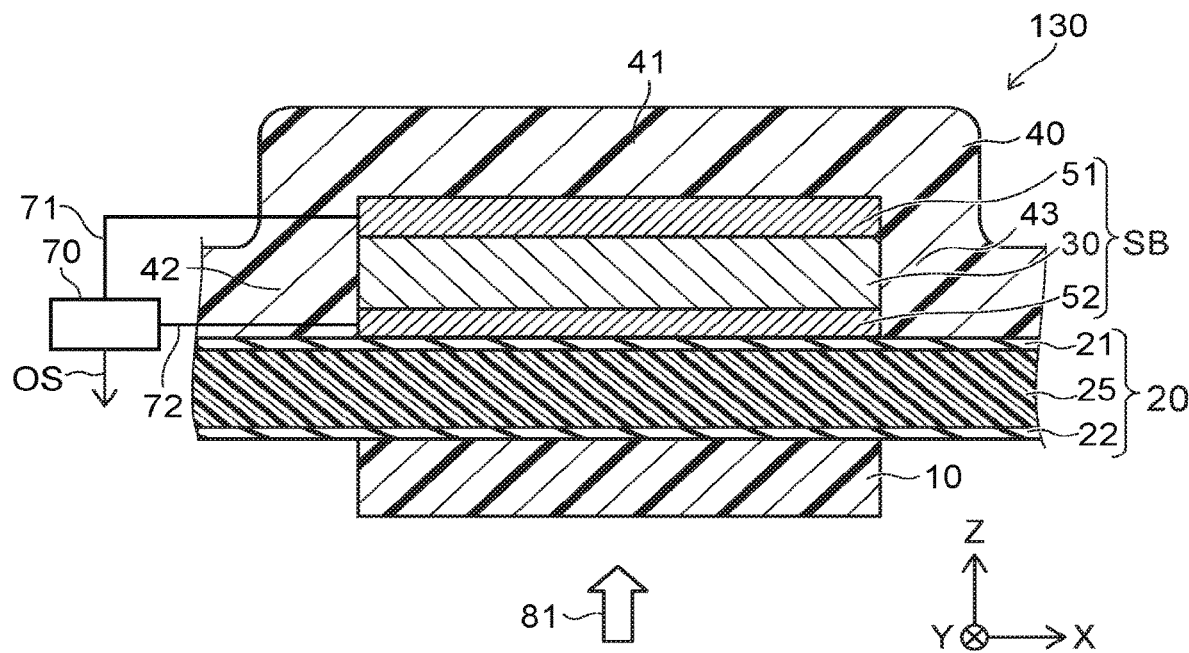
FIG. 12 is a schematic cross-sectional view illustrating a radiation detector according to a third embodiment.

FIG. 12 is a schematic cross-sectional view illustrating a radiation detector according to a third embodiment.

As shown in FIG. 12, the radiation detector 130 according to the third embodiment includes a structure body 40 in addition to the first layer 10, the first conductive layer 51, the second conductive layer 52, the organic semiconductor layer 30, and the second layer 20. The configurations described in reference to the first embodiment and the second embodiment are applicable to the first layer 10, the first conductive layer 51, the second conductive layer 52, the organic semiconductor layer 30, and the second layer 20 of the radiation detector 130. In the example, the second layer 20 includes the organic layer 25, the first intermediate layer 21, and the second intermediate layer 22. In the radiation detector 130, the second layer 20 may include at least one of the first intermediate layer 21 or the second intermediate layer 22.

An example of the structure body 40 will now be described.

The structure body 40 includes a first partial region 41, a second partial region 42, and a third partial region 43. The second layer 20 is between the first layer 10 and the first partial region 41 in the first direction (e.g., the Z-axis direction). The first conductive layer 51, the second conductive layer 52, and the organic semiconductor layer 30 are between the second layer 20 and the first partial region 41 in the first direction. Thus, a stacked body SB which includes the first conductive layer 51, the second conductive layer 52, and the organic semiconductor layer 30 is provided between the second layer 20 and the first partial region 41.

The stacked body SB (the first conductive layer 51, the second conductive layer 52, and the organic semiconductor layer 30) is between the second partial region 42 and the third partial region 43 in a second direction crossing the first direction. The second direction is any direction crossing the first direction (the Z-axis direction). In the example, the second direction is the X-axis direction. For example, the second partial region 42 and the third partial region 43 are provided around the stacked body SB in the X-Y plane (in a plane crossing the first direction). For example, the second partial region 42 and the third partial region 43 surround the stacked body SB in the X-Y plane. The second partial region 42 and the third partial region 43 are bonded to the second layer 20. For example, the second partial region 42 and the third partial region 43 may be directly bonded to the second layer 20. For example, the second partial region 42 and the third partial region 43 may be bonded to the second layer 20 by a bonding layer, etc.

For example, the organic semiconductor layer 30 is sealed with the second layer 20 and the structure body 40. For example, the second layer 20 and the structure body 40 function as a sealing portion. High reliability is obtained due to the second layer 20 and the structure body 40.

Fourth Embodiment

Figure 13:
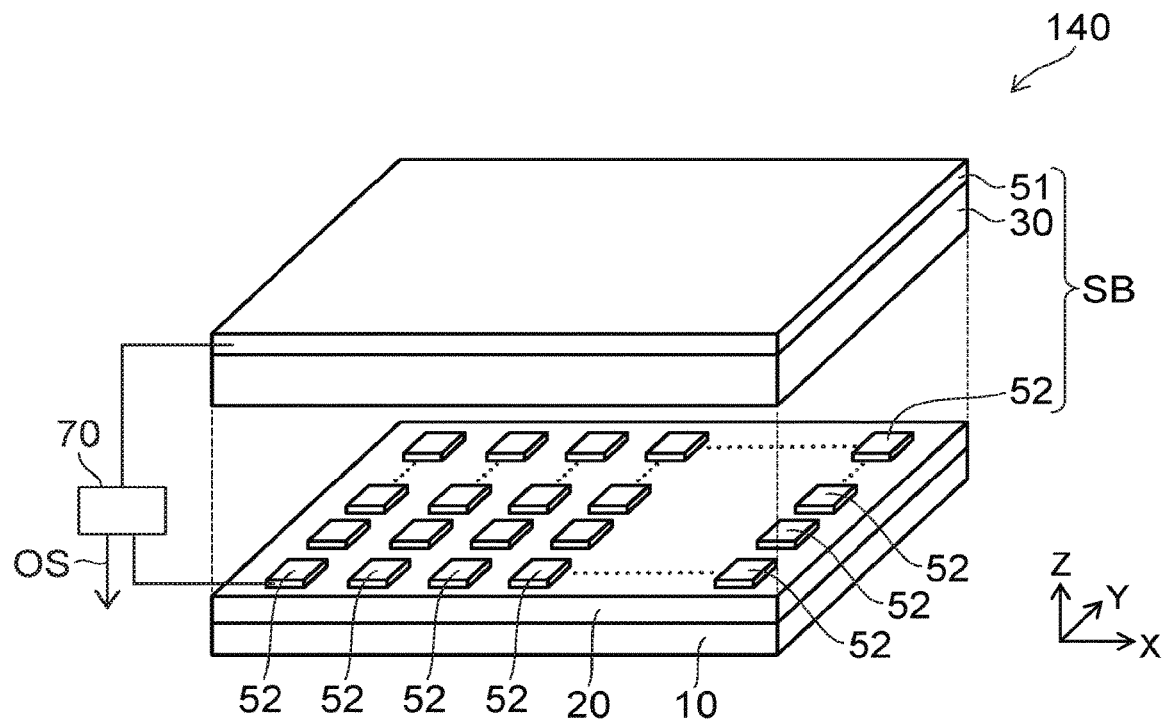
FIG. 13 is a schematic perspective view illustrating a radiation detector according to a fourth embodiment.

FIG. 13 is a schematic perspective view illustrating a radiation detector according to a fourth embodiment.

As shown in FIG. 13, the radiation detector 140 according to the fourth embodiment includes the first layer 10, the first conductive layer 51, the second conductive layer 52, the organic semiconductor layer 30, and the second layer 20. The structure body 40 may be provided in the radiation detector 140. In FIG. 13, a portion of the components included in the radiation detector 140 are drawn as being separated from each other for easier viewing of the drawing.

Multiple second conductive layers 52 are provided in the radiation detector 140. The multiple second conductive layers 52 are arranged along a plane (e.g., the X-Y plane) crossing the Z-axis direction. For example, the multiple second conductive layers 52 are arranged in a matrix configuration along the X-axis direction and the Y-axis direction. In the example, the first conductive layer 51 is continuous; and the organic semiconductor layer 30 is continuous.

In the embodiment, the second conductive layer 52 includes, for example, a metal oxide film. The metal oxide film includes, for example, at least one selected from the group consisting of indium oxide, zinc oxide, tin oxide, and ITO.

The first conductive layer 51 includes, for example, a metal thin film. The first conductive layer 51 includes, for example, a film including an alloy. The first conductive layer 51 may include, for example, a conductive metal oxide. The first conductive layer 51 may be, for example, light-reflective. The efficiency of the photoelectric conversion of the organic semiconductor layer 30 can be increased.

An intermediate layer may be provided between the organic semiconductor layer 30 and the first conductive layer 51 and/or between the organic semiconductor layer 30 and the second conductive layer 52. The intermediate layer includes, for example, PEDOT:PSS. The intermediate layer includes a polythiophene polymer.

In the embodiment, the radiation detector may include the detection circuit 70 (referring to FIG. 1, etc.) electrically connected to the first conductive layer 51 and the second conductive layer 52. The detection circuit 70 outputs the signal OS corresponding to the intensity of the radiation 81 incident on the first layer 10. The sensitivity of the signal OS to β-rays is higher than the sensitivity of the signal OS to γ-rays. The ratio of the change of the signal OS to the change of the intensity of the β-rays is higher than the ratio of the change of the signal OS to the change of the intensity of the γ-rays. In the embodiment, β-rays can be detected with high accuracy while suppressing the effects of γ-rays.

The embodiments may include the following configurations (e.g., technological proposals).

Configuration 1
A radiation detector, comprising:
a first layer including a metal complex;
a first conductive layer;
a second conductive layer provided between the first layer and the first conductive layer; and
an organic semiconductor layer provided between the first conductive layer and the second conductive layer.

Configuration 2
The radiation detector according to Configuration 1, wherein
the metal complex includes a first metallic element,
the first metallic element includes at least one selected from the group consisting of Ir, Pt, and Cu.

Configuration 3
The radiation detector according to Configuration 2, wherein the first metallic element includes Ir.

Configuration 4
The radiation detector according to any one of Configurations 1 to 3, wherein a concentration of the metal complex in the first layer is not less than 0.05 wt % and not more than 40 wt %.

Configuration 5
The radiation detector according to Configuration 4, wherein the concentration is not less than 0.5 wt % and not more than 10 wt %.

Configuration 6
The radiation detector according to any one of Configurations 1 to 5, wherein a sum of a thickness of the first layer and a thickness of the organic semiconductor layer is 1.5 mm or less.

Configuration 7
The radiation detector according to Configuration 6, wherein the thickness of the organic semiconductor layer is greater than 1 μm and not more than 50 μm.

Configuration 8
The radiation detector according to Configuration 6, wherein the thickness of the organic semiconductor layer is greater than 1 μm and not more than 10 μm.

Configuration 9
The radiation detector according to any one of Configurations 6 to 8, wherein the thickness of the first layer is not less than 200 μm and not more than 1500 μm.

Configuration 10
The radiation detector according to any one of Configurations 1 to 9, wherein
the first layer includes an organic portion, and
the organic portion includes at least one selected from the group consisting of polyvinyl carbazole, polyvinyl toluene, polystyrene, and polymethyl methacrylate.

Configuration 11
The radiation detector according to any one of Configurations 1 to 10, wherein
the organic semiconductor layer includes a p-type region and an n-type region,
the p-type region includes P3HT (Poly(3-hexylthiophene)), and
the n-type region includes fullerene.

Configuration 12
The radiation detector according to Configuration 11, wherein the n-type region includes $PC_{61}BM$ ([6,6]-phenyl-C61-butyric acid methyl ester).

Configuration 13
The radiation detector according to any one of Configurations 1 to 12, further comprising a second layer provided between the first layer and the second conductive layer,
the second layer including an organic layer.

Configuration 14
The radiation detector according to Configuration 13, wherein
the second layer includes at least one of a first intermediate layer or a second intermediate layer,
the first intermediate layer is provided between the organic layer and the second conductive layer and includes a first element, the first element including at least one of silicon or aluminum, and
the second intermediate layer is provided between the first layer and the organic layer and includes a second element, the second element including at least one of silicon or aluminum.

Configuration 15
The radiation detector according to Configuration 14, wherein
a thickness of the first intermediate layer is not less than 1/600 times and not more than 1/5 times a thickness of the organic layer, and
a thickness of the second intermediate layer is not less than 1/600 times and not more than 1/5 times the thickness of the organic layer.

Configuration 16
The radiation detector according to Configuration 14 or 15, wherein
the first intermediate layer includes the first element and at least one of oxygen or nitrogen, and
the second intermediate layer includes the second element and at least one of oxygen or nitrogen.

Configuration 17
The radiation detector according to any one of Configurations 1 to 16, further comprising a structure body,
the structure body including a first partial region, a second partial region, and a third partial region,
the second layer being between the first layer and the first partial region in a first direction,
the first conductive layer, the second conductive layer, and the organic semiconductor layer being between the second layer and the first partial region in the first direction, the first conductive layer, the second conductive layer, and the organic semiconductor layer being between the second partial region and the third partial region in a second direction crossing the first direction, the second partial region and the third partial region being bonded to the second layer.
Configuration 18

The radiation detector according to Configuration 17, wherein the organic semiconductor layer is sealed with the second layer and the structure body.
Configuration 19

The radiation detector according to any one of Configurations 1 to 18, further comprising a detection circuit electrically connected to the first conductive layer and the second conductive layer, the detection circuit outputting a signal corresponding to an intensity of radiation incident on the first layer, a sensitivity of the signal to β-rays being higher than a sensitivity of the signal to γ-rays.

According to the embodiments, a radiation detector can be provided in which the detection accuracy can be increased.

In the specification, a "state of being electrically connected" includes a state in which multiple conductors are in physical contact and currents flow between multiple conductors. The "state of being electrically connected" includes a state in which another conductor is inserted between the multiple conductors and currents flow between these conductors.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in radiation detectors such as conductive layers, first layers, organic semiconductor materials, metal complexes, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all radiation detectors practicable by an appropriate design modification by one skilled in the art based on the radiation detectors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A radiation detector, comprising:
a first layer including a metal complex,
a first conductive layer;
a second conductive layer provided between (i) the metal complex of the first layer and (ii) the first conductive layer;
an organic semiconductor layer provided between the first conductive layer and the second conductive layer; and
a second layer provided between the first layer and the second conductive layer, the second layer including an organic layer.
2. The detector according to claim 1, wherein
the metal complex includes a first metallic element, and
the first metallic element includes at least one selected from the group consisting of Ir, Pt, and Cu.
3. The detector according to claim 2, wherein the first metallic element includes Ir.
4. The detector according to claim 1, wherein a concentration of the metal complex in the first layer is not less than 0.05 wt % and not more than 40 wt %.
5. The detector according to claim 4, wherein the concentration is not less than 0.5 wt % and not more than 10 wt %.
6. The detector according to claim 1, wherein a sum of a thickness of the first layer and a thickness of the organic semiconductor layer is 1.5 mm or less.
7. The detector according to claim 6, wherein the thickness of the organic semiconductor layer is greater than 1 μm and not more than 50 μm.
8. The detector according to claim 6, wherein the thickness of the organic semiconductor layer is greater than 1 μm and not more than 10 μm.
9. The detector according to claim 6, wherein the thickness of the first layer is not less than 200 μm and not more than 1500 μm.
10. The detector according to claim 1, wherein
the first layer includes an organic portion, and
the organic portion includes at least one selected from the group consisting of polyvinyl carbazole, polyvinyl toluene, polystyrene, and polymethyl methacrylate.
11. The detector according to claim 1, wherein
the organic semiconductor layer includes a p-type region and an n-type region,
the p-type region includes P3HT (Poly(3-hexylthiophene)), and
the n-type region includes fullerene.
12. The detector according to claim 11, wherein the n-type region includes $PC_{61}BM$ ([6,6]-phenyl-C61-butyric acid methyl ester).
13. The detector according to claim 1, wherein
the second layer includes at least one of a first intermediate layer or a second intermediate layer,
the first intermediate layer is provided between the organic layer and the second conductive layer and includes a first element, the first element including at least one of silicon or aluminum, and
the second intermediate layer is provided between the first layer and the organic layer and includes a second element, the second element including at least one of silicon or aluminum.

14. The detector according to claim 13, wherein
a thickness of the first intermediate layer is not less than 1/600 times and not more than 1/5 times a thickness of the organic layer, and
a thickness of the second intermediate layer is not less than 1/600 times and not more than 1/5 times the thickness of the organic layer.

15. The detector according to claim 13, wherein
the first intermediate layer includes the first element and at least one of oxygen or nitrogen, and
the second intermediate layer includes the second element and at least one of oxygen or nitrogen.

16. The detector according to claim 1, further comprising a structure body,
the structure body including a first partial region, a second partial region, and a third partial region,
the second layer being between the first layer and the first partial region in a first direction,
the first conductive layer, the second conductive layer, and the organic semiconductor layer being between the second layer and the first partial region in the first direction,
the first conductive layer, the second conductive layer, and the organic semiconductor layer being between the second partial region and the third partial region in a second direction crossing the first direction,
the second partial region and the third partial region being bonded to the second layer.

17. The detector according to claim 16, wherein the organic semiconductor layer is sealed with the second layer and the structure body.

18. A radiation detector, comprising:
a first layer including a metal complex;
a first conductive layer;
a second conductive layer provided between (i) the metal complex of the first layer and (ii) the first conductive layer;
an organic semiconductor layer provided between the first conductive layer and the second conductive layer; and
a detection circuit electrically connected to the first conductive layer and the second conductive layer,
the detection circuit outputting a signal corresponding to an intensity of radiation incident on the first layer,
a sensitivity of the signal to $\beta$-rays being higher than a sensitivity of the signal to $\gamma$-rays.

* * * * *